Dec. 4, 1956 R. B. DOME 2,773,122

VIDEO FROM SYNC SIGNAL SEPARATOR

Filed Sept. 20, 1951

Inventor:
Robert B. Dome,
by Merton D. Morse
His Attorney.

United States Patent Office 2,773,122
Patented Dec. 4, 1956

2,773,122

VIDEO FROM SYNC SIGNAL SEPARATOR

Robert B. Dome, Syracuse, N. Y., assignor to General Electric Company, a corporation of New York Application September 29, 1951, Serial No. 247,422

5 Claims. (Cl. 178—7.3)

Figure 1:
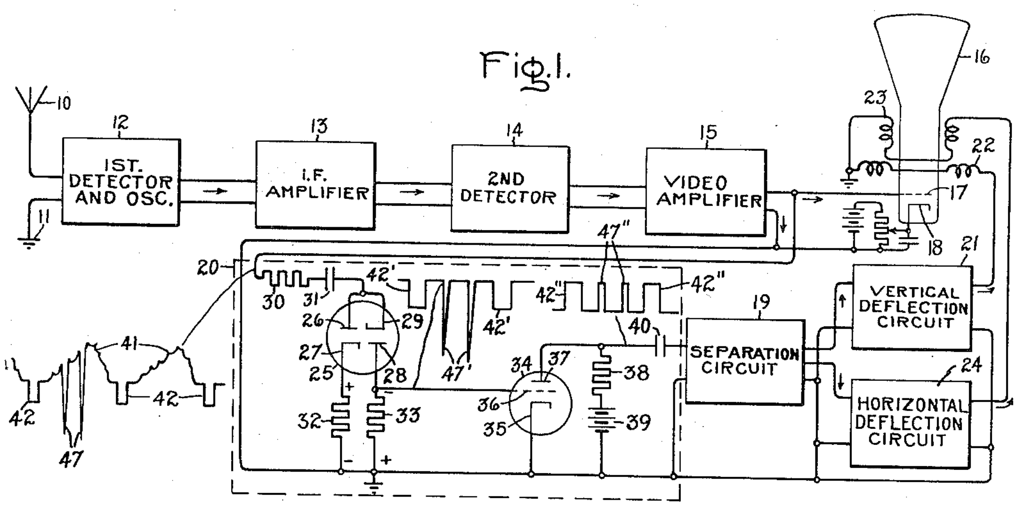

This invention relates to television receiving apparatus and more particularly to a novel synchronizing signal clipping system for such receivers. Although the invention may be employed in a variety of environments, it is ideally suited for incorporation in a television receiver which utilizes a composite signal including video components and synchronizing components having amplitude values outside the amplitude range of the video components. For convenience, it will be described in that connection.

One form of clipper circuit heretofore employed for deriving the synchronizing components of a composite television signal, to the exclusion of video components, includes an electron discharge tube of the triode or pentode type. The composite signal is applied to the grid-cathode circuit with the synchronizing pulses extending in a positive polarity sense or direction and separated synchronizing pulses are derived with opposite polarity sense in the anode circuit of the tube.

The circuit constants are designed so that grid current flows during the occurrence of each synchronizing pulse and this current charges a capacitor in the grid-cathode circuit to establish a bias potential of a magnitude sufficient to permit anode current to flow only for the duration of each synchronizing pulse.

This clipper performs satisfactorily under favorable operating conditions, but impulse noise having an amplitude exceeding that of the synchronizing pulses produces a component of grid current in addition to that of the synchronizing pulses thereby increasing the grid bias voltage. Thus, instead of achieving a clipping level dictated by the synchronizing pulses, the peaks of the noise impulses control the clipping level and the synchronizing pulses are effectively depressed below the grid bias level and so are excluded from the output circuit of the clipper along with the video information.

It is an object of this invention, therefore, to provide a signal amplitude clipping system that is not subject to the deficiencies of the just-described prior arrangement and which operates substantially instantaneously to establish a clipping level.

Another object of the present invention is to provide a novel amplitude clipper for a television receiver to separate synchronizing information from a composite television signal, to the exclusion of video information, and yet is wholly operative in the presence of impulse noise having an amplitude exceeding that of the synchronizing components.

In a television receiver it is not feasible to translate the average or mean value of the video information which represents back ground illumination of a transmitted signal. This is understandable because variations in background illumination occur at too slow a rate to be accommodated within the pass-band of the video amplifier stages. Hence, some means must be provided for restoring this portion of the video information at the image reproducing device, usually a cathode ray tube. Generally, this is accomplished by an additional direct current restoring stage coupled to the control electrode-cathode circuit of the cathode ray tube. It is apparent that by obtaining direct current restoration from a stage performing another function, a material saving in cost could be realized.

Consequently, it is another object of this invention to provide an improved amplitude clipping system for a television receiver which obviates the need for an additional D.-C. restoring stage.

A further object of the invention is to provide an improved combined amplitude clipping and D.-C. restoring system.

An amplitude clipping system in accordance with the invention may be employed in a television receiver having one or more stages adapted to translate a composite television signal including video components and synchronizing components having amplitude values outside the maximum amplitude range of the video components. Briefly stated, the clipping system comprises a first rectifying device and an associated load impedance connected in series to the output circuit of the translating stages. A second rectifier is connected in series with another load impedance and this combination is also connected to the output circuit. The rectifiers are oppositely poled and the impedance values of the two load impedances are apportioned so that the first conducts current during intervals in which the video components occur and the other conducts in response to the synchronizing signal components. The dividing amplitude at which conduction is transferred from one rectifier to the other is established, in the ideal case, at the maximum amplitude excursions of the video components. Synchronizing components are thus derived at the impedance associated with the second rectifier in a negative polarity sense with respect to a plane of fixed reference potential, such as ground. An amplitude clipper is directly coupled to that impedance and translates a portion of the negative amplitude excursions of the derived synchronizing components. This portion of the synchronizing information may be utilized for synchronizing the operation of the sweep circuits associated with the image reproducing device of the receiver, such as a cathode ray tube.

Another feature of the invention pertains to direct current restoration, and accordingly, the input electrodes, such as the control electrode and cathode, of the cathode ray tube are directly coupled to the impedance associated with the first rectifier. The video information there available controls the electron beam intensity of the cathode ray tube and since the average or slow potential variations, representing background illumination of a transmitted image, are derived, a corresponding back ground level is reproduced on the viewing screen of the cathode ray tube.

Figure 2:
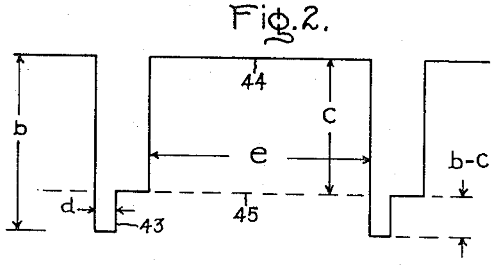
Figure 3:
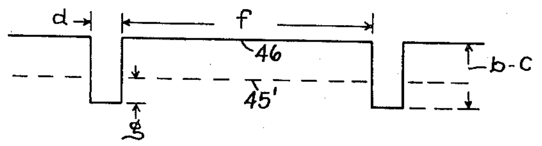
Figure 4:
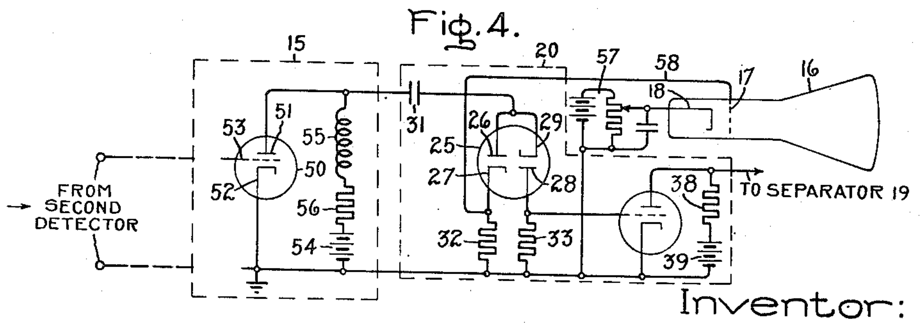

The features of the present invention, believed to be novel, are set forth with particularity in the appended claims. The invention, itself, however, both as to its organization and method of operation, together with further objects and advantages thereof may best be understood by reference to the following description taken in conjunction with the accompanying drawing in which Fig. 1 is a schematic diagram, partly in block form, of a complete television receiver incorporating a signal amplitude clipping system in accordance with the present invention; Figs. 2 and 3 illustrate certain wave forms associated with the circuit of Fig. 1 which are useful in describing its operation; and Fig. 4 represents a modification of the circuit shown in Fig. 1.

With reference, now to Fig. 1, the receiver there illustrated is of the superheterodyne type and includes an antenna-ground system 10—11 coupled to a first detector and oscillator stage 12, to which is connected, in cascade in the order named, an intermediate-frequency amplifier 13 of any desired number of stages, a second detector 14 and a video amplifier 15. The receiver includes an image-reproducing device 16 which may be a cathode-ray signal-reproducing tube having a control electrode 17 and a cathode 18 coupled to the output circuit of video amplifier 15.

The output circuit of amplifier 15 is also coupled to a synchronizing signal separation circuit 19 through a signal amplitude clipping system 20 presently to be described. Separator 19 has one output circuit, in which vertical or frame synchronizing pulses are derived, coupled to a vertical deflection circuit 21 in turn coupled to vertical deflection coils 22 of reproducing device 16. In another output circuit of separator 19, line or horizontal synchronizing pulses are derived and this circuit is coupled to line deflection coils 23 of device 16 through a horizontal deflection circuit 24. The stages 12—16, 19, 21 and 24 may all be of conventional well-known construction so that detailed illustrations and descriptions thereof are deemed unnecessary herein.

Referring briefly, however, to the operation of the system described above, television signals are intercepted by antenna circuit 10—11 and are converted to intermediate-frequency signals in stage 12, which in turn are selectively amplified in the intermediate-frequency amplifier 13 and delivered to the detector 14. The modulation components of the signal are derived by the detector and are supplied to video frequency amplifier 15 wherein they are amplified and from which they are supplied in the usual manner to the brilliancy-control elements 17—18 of reproducing device 16.

The intensity of the scanning beam of the device 16 is thus modulated or controlled in accordance with the light-modulation voltages impressed between elements 17 and 18, in the usual manner. Saw-tooth voltage or current waves generated in the vertical and horizontal deflection circuits 21 and 24, respectively, which are controlled by synchronizing pulses supplied from the apparatus of the present invention through separator 19, are applied to the scanning elements 22 and 23 of the picture tube to produce electric scanning fields, thereby deflecting the ray in directions normal to each other so as to trace a rectilinear scanning pattern on the viewing screen of the tube and thereby reconstruct the transmitted image.

Referring, now, more particularly to the portion of the receiver of Fig. 1 embodying the present invention, unit 20 includes a dual-diode type electron tube 25. One rectifier section of the tube is comprised of an anode 26 and a cathode 27 and the other section likewise has an anode 28 and a cathode 29. Anode 26 of one rectifier is directly connected to cathode 29 of the other and these electrodes are coupled to one terminal of the output circuit of video amplifier 15 through the series combination of a current-limiting resistor 30 and a blocking condenser 31. The remaining terminal in the output circuit of amplifier 15 is grounded and cathode 27 is connected to ground through a load-impedance resistor 32, thereby forming a first unidirectionally conductive signal-current path comprised of diode 26—27 and impedance 32. Anode 28 is grounded through another load-impedance resistor 33 to form a second unidirectionally conductive signal-current path including diode 28—29 and impedance 33 coupled in parallel with the first path, but in opposite polarity sense.

Although the diodes have been illustrated as being of the electron-discharge variety, it is to be understood that any other known forms of rectifying devices may be suitably employed, such as those of the germanium crystal type.

Unit 20 further includes a triode-type electron tube 34 in an amplitude clipper circuit. Its cathode 35 is grounded, its control electrode 36 is directly connected to the junction of resistor 33 and anode 28 of dual-diode 25. Anode 37 of tube 34 is connected through a load resistor 38 to the positive terminal of a source of B-supply potential 39, the negative terminal of which is grounded.

A coupling condenser 40 and appropriate ground connections complete a coupling circuit between unit 20 and separator 19.

In operation, a composite television signal is translated by amplifier 15 and supplied to the clipping system 20 with the synchronizing components extending in a negative polarity sense with respect to the alternating potential axis of the signal. This signal is represented by the wave form in Fig. 1 in which the video components are designated 41 and the synchronizing components are identified by the numeral 42. Diodes 26—27 and 28—29 operate as rectifiers and split the amplitude of the composite signal into two portions. By suitably selecting the values for resistors 32 and 33, it is possible to effect this division in the region of the composite wave including synchronizing pulses 42, as will be more apparent from the discussion to follow.

The picture components 41 appearing across load 32 are not employed for intensity control in the embodiment of the invention shown in Fig. 1, the composite video signal being supplied directly to the picture tube 16 via the coupling circuit between amplifier 15 and picture tube 16. However, the circuit does utilize the negative-going synchronizing pulses developed across load 33. Since one terminal of load impedance 33 is grounded, the derived synchronizing pulses extend in a negative sense from the ground plane. In other words, the reference point is ground. These pulses are applied between grid 36 and cathode 35 of tube 34 through a direct connection and the most negative-going portions of the pulses extend below the cutoff voltage for the tube. Consequently, output pulses of constant amplitude are derived in the anode circuit of triode 34 for application to separator 19.

The relative values for resistors 32 and 33 may be determined by considering the most difficult separation case, i. e., one for all-white picture as represented by the wave form of Fig. 2. An ideal composite signal including synchronizing pulses 43 and video portions 44 is shown. Let it be assumed that a cleavage or separation line is to be established at the maximum amplitude value for the video components of the composite signal, as illustrated by the horizontal dash line 45. That is, the portion of the composite signal below the line is to appear across resistor 33, whereas the part above the line is to appear across resistor 32. Stated another way, the line 45 represents ground potential at the output element of either of diodes 26—27 or 28—29.

Let it further be assumed that: the ratio of resistors 32 and 33 is "$a$"; that the maximum amplitude of the entire composite signal is "$b$"; that the maximum amplitude of the video components of the composite signal is "$c$"; that the time duration in microseconds of the synchronizing pulse is "$d$"; and that the time duration in microseconds of the video interval is "$e$." On the basis of the areas on each side of axis line 45, $$ad\ (b-c)=ec$$

or $$a=ec\div[d(b-c)]. \qquad (1)$$

If a composite television signal transmitted in accordance with present-day standards is utilized, in which the quantity $b$ is considered as unity, then $c=0.75$. Also, by that standard, $d=0.08H$, and $e=0.84H$ where $H=63.5$ microseconds, the time interval between successive synchronizing pulses. Substituting these quantities in Equation 1, $$a=(0.84H)\times(0.75)\div[(0.08H)\times(0.25)] \qquad (2)$$

Consequently, it may be seen that for this example the ratio of resistors 32 and 33 is 31.5.

A higher ratio than 31.5 may be advantageously employed to move line 45 downward in Fig. 2. This gives added insurance of clipping in case the transmitted signal includes synchronizing pulses of lesser amplitude than in the case of a standard signal. Of course, at the same time the output signal potential available at resistor 33 is decreased as the quantity "$a$" is increased.

In considering an all-black picture, such as represented by curve 46 in Fig. 3, line 45 moves downward to the position indicated by the numeral 45' to satisfy the same area relationships of Equation 1. If "$f$" is the new duration of the portion of the composite signal 46 above line 45' and "$g$" is the amplitude difference between the peak of the synchronizing pulse and the new dividing line 45', then $$adg=f(b-c-g)$$

or $$g=f(b-c)\div(ad+f) \quad (3)$$

For this case $f=0.92H$ and substituting the same values employed in connection with Equation 2, it may be seen that $$g=(0.92)\times(0.25)\div(0.08a+0.92) \quad (4)$$

Substituting the value for $a$ of 31.5 in Equation 4, $$g=0.0668 \quad (5)$$

This value for the quantity "$g$" may be better understood by considering a practical example in which the composite signal peak-to-peak voltage applied to stage 20 is 40 volts. In the case of an all-white picture, such as illustrated in Fig. 2, the synchronizing pulse amplitude available at resistor 33 is 10 volts, whereas for an all-black picture, such as illustrated by the wave form of Fig. 3, this amplitude is 2.67 volts. By employing an amplitude clipper (triode 34) having a sharp cutoff characteristic at −1 volt and a gain of 30, it is apparent that for either kind of picture the clipped synchronizing pulses supplied to separator 19 have an amplitude of 30 volts. It will be apparent from Fig. 1 that, since both the signal-current paths 26, 27, 32 and 33, 28, 29 comprise only resistive impedances, the clipping level varies substantially instantaneously with changes in picture signal content.

In considering the noise characteristic of unit 20, let it be assumed that impulse noise, represented by the pulses 47, accompanies wave form 41—42 of Fig. 1 as it is supplied to the amplitude clipping system. The noise pulses 47, like synchronizing pulses 42, extend in a negative polarity sense and at resistor 33 the separated synchronizing pulses represented by curve 42' are accompanied by clipped noise pulses 47'. It will be observed that at this point of the circuit, the amplitude of the noise pulses still exceed the synchronizing pulse amplitude. Since diode 28—29 cannot produce positive voltage with respect to ground, and one terminal of load 33 is at ground potential, the base line of curve 42'—47' remains smooth. This signal is supplied to triode 34, which eliminates or clips all signal amplitudes extending more negative than its cutoff bias. Thus, the output signal from tube 34 is of constant amplitude, including clipped synchronizing pulses indicated by the numeral 42'' as well as clipped noise pulses 47''. Inasmuch as the duration of synchronizing pulses 42'' is greater than that of noise pulses 47'', a simple integration of wave 42''—47'' could effectively alter the amplitude proportions between the synchronizing and noise components of this signal, thereby to facilitate still further the separation of these components. Circuits for this purpose are generally well-known and need not be described. In constructing a practical embodiment of the synchronizing signal clipping system in accordance with the invention, the following components were employed:

| | |
|---|---|
| Dual diode **25** | Type 6H6. |
| Condenser **31** | 0.01 microfarads. |
| Resistor **30** | 10,000 ohms. |
| Resistor **32** | 1.5 megohms. |
| Resistor **33** | 43,000 ohms. |

Fig. 4 represents a modification of the circuit of Fig. 1 which may be used as a combined amplitude clipper and direct current restorer. Elements which correspond to those of Fig. 1 are identified by the same reference numerals. The final stage of video amplifier 15 is illustrated as including a triode type electron tube having an anode 51, cathode 52 and a control electrode 53. Input signals are supplied between control electrode 53 and cathode 52. Anode 51 is connected to a source of B-supply potential 54 through the series combination of a peaking coil 55 and a load resistor 56. Appropriate ground connections and coupling condenser 31 serve electrically to couple units 15 and 20. In this embodiment resistor 30 shown in Fig. 1 is omitted. Cathode 18 of picture tube 16 is grounded through a brightness control arrangement 57 and its control electrode 17 is connected via a lead 58 to the junction of impedance 32 and cathode 27 of dual diode 25.

The clipping operation performed by the circuit of Fig. 4 follows that described in connection with Fig. 1 and, hence, need not be repeated. As pointed out in connection with Figs. 2 and 3, the dividing level 45—45' changes substantially instantaneously with picture content. Consequently, not only do the fast-varying video undulations appear across resistor 32, but the slow, background-illumination values are also derived. Thus, the slow-changing or direct current picture level is restored at control electrode 17 of picture tube 16.

Inasmuch as unit 20 performs its clipping function as well as that of direct current restoration, the need for an additional direct current restorer stage is obviated.

While specific embodiments have been shown and described, it will be understood that various modifications may be made and developed. However, the appended claims are intended to cover any such modifications within the true spirit and scope of the invention.

What I claim as new and desire to obtain as Letters Patent of the United States is:

1. An amplitude-selective translating system for separating an electrical signal wave having one or more frequency components into two amplitude portions, comprising a pair of unidirectionally-conductive signal-current paths connected in parallel, each of said paths offering substantially non-reactive impedance to currents of all signal frequencies flowing therein, means including a capacitor for impressing said wave on an ungrounded end of said paths, the opposite ends of said paths being grounded, each said path comprising a unilaterally-conducting device and a substantially non-reactive load impedance connected in series in the order named between the ungrounded and grounded ends of said paths, said devices being oppositely-poled and the values of said impedances being pre-selected to provide a predetermined division of signal currents between said two paths for a given input waveform, and a utilization circuit energized in response to signal potentials developed across one of said load impedances.

2. An amplitude-selective translating system for separating a complex electrical signal wave having a plurality of frequency components into two amplitude portions, comprising a pair of input terminals adapted to have said wave impressed thereon, a capacitor connected to one of said terminals, two parallel rectifier circuits connected between said capacitor and the other of said terminals each consisting of a rectifier and series resistance, said rectifiers being oppositely poled with respect to current flow between said terminals and being nearer said capacitor, the total effective resistance in each said rectifier circuit being pre-selected to provide a desired division of currents between said circuits for any given input waveform, and a limiting amplifier having an input circuit energized by the potentials developed on one of said series resistances.

3. In a television receiver, a synchronizing pulse separation circuit comprising first and second input terminals and having a capacitor for impressing a composite television signal wave on first said terminal, said wave having periodic synchronizing pulse portions extending in a negative direction with respect to the alternating-current axis of said wave at said first terminal and intermediate video signal portions extending in a positive sense from said axis at said first terminal, the combination therewith of a first rectifier and a first load resistance connected in the order named and in series between said terminals, said rectifier being conductive in the positive sense, a second rectifier and a second load resistance connected in series in the order named between said terminals, said second rectifier being conductive in the negative sense, said resistances having pre-selected values such that current flows in said second circuit only during synchronizing pulse portions of said wave, and a limiting amplifier having an input circuit conductively coupled to said second resistance, said amplifier being arranged to be biased to cutoff by flow of current in said second circuit exceeding a predetermined value.

4. In a television receiver comprising first and second input terminals and having a condenser for impressing a composite television signal wave on said first terminal, said wave having periodic synchronizing pulse portions extending in a negative direction with respect to the alternating-current axis of said wave at said first terminal and intermediate video signal portions extending in a positive sense from said axis at said first terminal, the combination therewith of a first diode rectifier having its anode conductively connected to said first terminal and a series load resistance connected between its cathode and said second terminal, a second diode rectifier having its cathode conductively connected to said first terminal and a second series load resistance connected between its anode and said second terminal, said second resistor being small enough with respect to said first resistor that the net positive charge on said condenser allows said cathode of said second diode rectifier to be depressed below that of said anode of said second diode rectifier only by the synchronizing pulses a video signal utilization circuit connected across at least a portion of said first resistance and a synchronizing pulse utilization circuit connected across at least a portion of said second resistance, the total impedance load presented to said terminals being substantially non-reactive at all signal frequencies present in said wave.

5. An amplitude selective translating system as defined in claim 2 wherein the resistance used for energizing said limiting amplifier has a maximum value which is less than one hundred thousand ohms.

References Cited in the file of this patent

UNITED STATES PATENTS

| | | |
|---|---|---|
| 2,210,523 | Blumlein | Aug. 6, 1940 |
| 2,227,056 | Blumlein | Dec. 31, 1940 |
| 2,240,289 | Dillenburger et al. | Apr. 29, 1941 |
| 2,424,349 | Cawein | July 22, 1947 |
| 2,498,839 | Hayward | Feb. 28, 1950 |
| 2,525,103 | Sprecher | Oct. 10, 1950 |
| 2,593,011 | Cotsworth | Apr. 15, 1952 |
| 2,650,300 | Huntley | Aug. 25, 1953 |